United States Patent [19]

Bronstein et al.

[11] Patent Number: 4,793,582
[45] Date of Patent: Dec. 27, 1988

[54] REAR VIEW MIRROR EXTENSION DEVICE

[76] Inventors: Benjamin Bronstein, 1831 Ord. Rd.; Hugh Russell, 3575 Westside Rd.; Donald G. Manke, 685 Harrington, all of Kamloops, B.C., Canada

[21] Appl. No.: 397,086

[22] Filed: Jul. 12, 1982

[30] Foreign Application Priority Data

Apr. 30, 1982 [CA] Canada ................................ 402032

[51] Int. Cl.⁴ .............................................. A47G 1/24
[52] U.S. Cl. ...................................... 248/486; 248/479
[58] Field of Search ............... 248/486, 485, 479, 480, 248/475 R, 478, 484, 282, 283; 403/62

[56] References Cited

U.S. PATENT DOCUMENTS

| | | | |
|---|---|---|---|
| 641,748 | 1/1900 | Smith | 403/62 |
| 1,828,804 | 10/1931 | Horton | 248/479 |
| 1,970,602 | 8/1934 | Geistlinger | 248/103 |
| 2,242,303 | 5/1941 | Irmischer | 248/282 |
| 2,830,781 | 4/1958 | Coulter | 248/103 |
| 3,348,799 | 10/1967 | Junkel et al. | 248/283 |
| 4,123,030 | 10/1978 | Johanson | 248/478 |
| 4,413,868 | 11/1983 | Gorkiewicz | 248/282 |

Primary Examiner—Ramon O. Ramirez
Attorney, Agent, or Firm—Peter L. Klempay

[57] ABSTRACT

The invention relates to a rear view mirror extension device for use with vehicles such as light duty trucks and the like which have, as standard equipment, a mirror connected to a tubular support arm secured to a mounting bracket on the vehicle door. The device includes an inverted U-shaped extension member having one leg thereof rotatably received in the vehicle mount in place of the original support arm. The support arm and the other leg of the extension member are each rotatably received in a clamp member. By suitably rotating the extension member and the clamp member relative to each other and the vehicle the mirror can be moved from a position closely approximating its original position near the vehicle to an extended position wherein it is spaced outwardly from the vehicle by the extension and clamp members. The driver can adjust the position of the mirror outwardly to compensate for wide loads or tows which would otherwise unduly obstruct his rearward view.

3 Claims, 1 Drawing Sheet

REAR VIEW MIRROR EXTENSION DEVICE

This invention relates to vehicular rear view mirrors in general and to a foldable mirror extension for trucks and the like in particular.

BACKGROUND OF THE INVENTION

Many light duty trucks, vans and recreational vehicles (RV's) are provided, as standard equipment, with relatively small outside rear view mirrors, there always being one on the driver's door and optionally one on the passenger's door. One common style of rear view mirror involves a generally rectangular mirror housing, a generally L-shaped tubular support extending horizontally from the housing and then vertically downwardly, and a suitable mount on the vehicle door for receiving the vertical leg of the support. The mirror housing is rotatable on the horizontal leg of the support and the vertical leg is rotatable in the door mount so as to provide for adjustability of the mirror face to suit the driver.

One drawback of such standard equipment mirrors becomes apparent when the vehicle, such as a pickup truck, has to carry or tow a wide load. For example if a camper body is loaded into the bed of the truck, which body usually extends sideways beyond the sides of the bed, the driver finds his view to the rear blocked by the extending sides of the camper body. Similar problems occur when towing a wide trailer.

It is already known that auxiliary mirror assemblies for both cars and trucks are available for use when towing a trailer or carrying a wide load. Such mirror assemblies are attachable to the vehicle fender forwardly of the windshield so that the mirror thereon is visible, the assembly placing a relatively large mirror farther out from the side of the vehicle than the standard equipment mirror. Such mirror assemblies are awkward to install, will vibrate in use, and increase the drag on the vehicle thereby increasing fuel consumption. There is, therefore, a need for a device which can be used to extend outwardly the location of an outside rear view mirror on a vehicle without succumbing to the disadvantages of prior art auxiliary mirror assemblies.

SUMMARY OF THE INVENTION

The present invention provides a mirror extension device which is particularly useful with standard equipment rear view mirrors of the aforementioned variety, that is those in which the mirror housing is carried by a tubular support arm rotatably received in a vehicle door mount. The present invention comprises a U-shaped extension member similar to the tubular arm of the mirror assembly, one leg of the extension member being substituted for the mirror support arm in the door mount. The other leg of the extension member is rotatably received in one of two cylindrical passages of a clamp member, the other passage of which rotatably receives the mirror support arm which had been removed from the door mount. The extension device permits the mirror to be positioned at any number of locations outwardly of the vehicle door just by rotating the extension member relative to the door mount while rotating the mirror support arm and the clamp member relative to the extension member. Thus with the extension device rotated in close to the door the mirror will be in essentially its original position while with the extension device rotated fully away from the door the mirror takes up a position farther away from the door and the driver will be able to have a better view behind his vehicle, a view which would be otherwise obstructed by his wide load or tow.

The extension device of this invention is easy to install, will not add vibration to the mirror and will have little or no effect on vehicle drag, especially when the load or tow is removed and the mirror is rotated in close to the vehicle body.

Broadly speaking therefore the present invention may be seen as providing an extension device for a vehicular mirror assembly having a mirror, a tubular support arm connected thereto, and mounting means for rotatably receiving the arm and for mounting the assembly to a vehicle, comprising: a generally U-shaped tubular extension member, one leg thereof being rotatably receivable in the mounting means in place of the arm, and a clamp member defining a pair of parallel passages therein, the tubular arm being rotatably receivable in one of the passages, and the other leg of the extension member being rotatably receivable in the other of the passages.

DESCRIPTION OF THE PREFERRED EMBODIMENT

Figure 1:
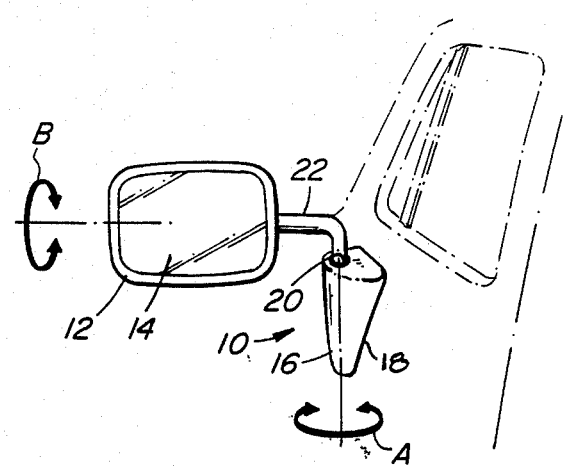
FIG. 1 shows a standard equipment rear view mirror assembly as it might appear on a vehicle.

FIG. 1 illustrates a typical rear view mirror assembly as might be provided as standard original equipment on a light duty vehicle such as a pick up truck. The assembly 10 includes a generally rectangular mirror housing 12 carrying a mirror 14. A suitable mount 16 is secured to the vehicle door, the mount shown being generally triangular in plan and in elevation and conforming on its inner surface 18 to the contour of the vehicle door. On the top surface of the mount is an opening 20 leading to the interior of the mount wherein is located suitable means to rotatably secure the support arm 22 for the mirror housing 12. The arm 22 is shown as being circular in cross-section and as being generally L-shaped in contour. The vertical leg of the arm is secured to the mount for rotation about a vertical axis (arrow A) and the housing 12 is secured to the horizontal leg of the arm 22 for rotation about a horizontal axis (arrow B) to achieve full adjustability to suit the driver.

Figure 2:
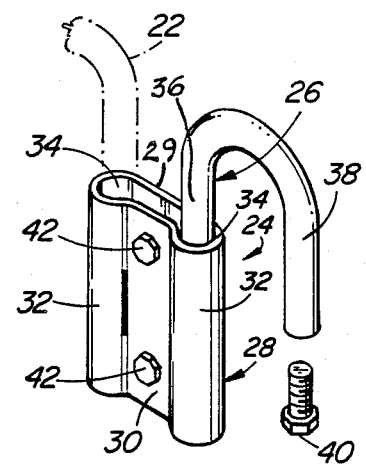
FIG. 2 shows in perspective the extension device of the present invention.

FIG. 2 illustrates the extension device of the present invention. That device 24 utilizes an inverted generally U-shaped tubular extension member 26 and a clamp member 28. The clamp member 28 is desirably formed from a length of tubular material deformed to the shape shown in FIG. 2 so as to have a flat rear wall 29, a flat front wall 30, and a pair of curved side walls 32, each side wall 32 defining a generally circular through passage 34. One of the passages 34 is adapted to receive one leg 36 of the extension member 26 and the other passage 34 is adapted to receive the vertical leg of the mirror support arm 22.

The other leg 38 of the extension member 26 is adapted to be received in the opening 20 of the vehicle mount 16. Depending on the type of mount provided on the vehicle it may be necessary to effect connection of the leg 38 thereto by way of a bolt 40 which can be received in the threaded bore (not shown) in the end of the leg 38.

As seen in FIG. 2 the clamp member 28 is desirably formed as a single piece of metal. Bolts 42 are provided extending through the walls 30,29 with nuts on the back side (not shown) so that when the bolts and nuts are tightened the side walls 32 will be tightly clamped about the legs of the support arm 22 and the extension member 26.

It would also be possible to form the clamp member of, say, two mating parts which, when positioned about the legs of the support arm 22 and the extension member 26 could be tightened together by the bolts 42 and the nuts secured thereto. It would also be possible to provide rubber bushings or the like within the passages 34 to provide additional frictional grip to the legs fitted therein and also to seal the passages from the intrusion of water and other harmful material.

Figure 4:
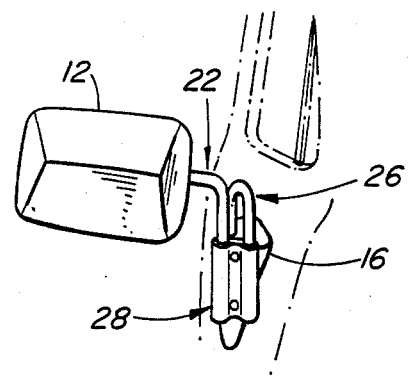
FIG. 4 shows the extension device connected to a mirror and in the retracted condition.

FIG. 4 shows the mirror assembly with the extension device 24 attached thereto and in a folded or non-extended condition, as when no wide load or tow obstructs the view to the rear. In this condition the extension member has been rotated in the door mount 16 so that the extension member 26 is generally parallel to the vehicle body and so that the clamp member 28 is generally perpendicular to the vehicle body. In this condition the mirror housing 12 assumes a position very close to its original position. Of course, the mirror could be brought in closer to the vehicle if the clamp member 28 is rotated so as to be parallel to the vehicle body.

Figure 3:
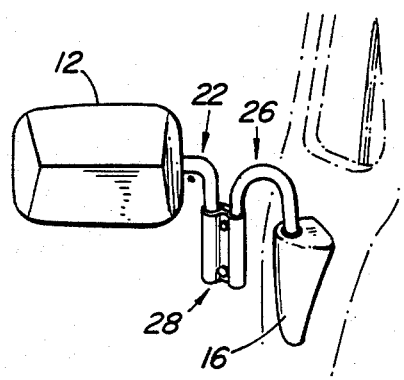
FIG. 3 shows the extension device connected to a mirror and in the extended condition.

In FIG. 3 the extended position of the mirror shown, the extension member 26 having been rotated so as to be generally perpendicular to the vehicle body and the clamp member 28 acting as a coplanar extension of the extension member 26. In this condition the support arm 22 would be essentially coplanar with the clamp member 28 and the extension member 26 so as to achieve the maximum separation between the mirror and the vehicle body.

To effect rotation, one merely loosens the bolts 42 enough so that the clamping effect of the sides 32 on the respective legs of the extension member and the mirror arm is reduced to the point that relative rotation is possible. Once the desired position is obtained the bolts 42 are again tightened to lock the assembly at that desired position.

It is understood that any position between minimum and maximum extension of the mirror could be selected by the driver depending upon the particular circumstances facing him.

One particular advantage of the present invention resides in the fact that once it has been installed on the vehicle, an easy task for the owner, it is not necessary to remove the extension device when its extension properties are not required. The device need only be folded into its unobtrusive non-extended condition, in which the driver has all the rearward visibility he requires.

The foregoing describes the best mode of putting the present invention into effect known at this time. However variations in the invention may occur to a skilled person in the art without departing from the spirit of the invention. Accordingly the protection to be afforded the invention is to be determined from the claims appended hereto.

The embodiments of the invention in which an exclusive property or privilege is claimed are defined as follows:

1. An extension device for a vehicular mirror assembly having a mirror, a tubular support arm connected thereto, and mounting means for rotatably receiving said arm and for mounting said assembly to a vehicle, comprising: a generally U-shaped tubular extension member, one leg thereof being rotatably receivable in said mounting means in place of said arm, and a clamp member defining a pair of parallel passages therein, said tubular arm, in use of said device, being rotatably receivable in one of said passages, and the other leg of said extension member being rotatably receivable in the other of said passages.

2. The extension device of claim 1 wherein said clamp member includes a pair of parallel generally cylindrical side walls interconnected by a rear wall and a front wall, each of said side walls defining one of said passages.

3. The extension device of claim 2 wherein said clamp member if formed as single piece of metal and said front and rear walls are adapted to receive therebetween means for tightening said side walls about said tubular arm and said other leg respectively.

* * * * *